United States Patent [19]

Reese

[11] Patent Number: 4,513,803
[45] Date of Patent: Apr. 30, 1985

[54] INFLATING GAS FOR TIRES

[75] Inventor: Thorsten Reese, Neustadt, Fed. Rep. of Germany

[73] Assignee: Continental Gummi-Werke Aktiengesellschaft, Hanover, Fed. Rep. of Germany

[21] Appl. No.: 408,077

[22] Filed: Aug. 16, 1982

Related U.S. Application Data

[63] Continuation of Ser. No. 121,642, Feb. 14, 1980, abandoned.

[30] Foreign Application Priority Data

Feb. 17, 1979 [DE] Fed. Rep. of Germany ....... 2906151

[51] Int. Cl.³ .............................................. B60C 29/00
[52] U.S. Cl. ...................................... 152/427; 141/38; 141/302; 152/330 R; 152/354 R; 152/DIG. 9; 252/372
[58] Field of Search ........... 152/415, 427, 428, 330 R, 152/354 R, 331, 361 R, DIG. 9, 362 R, 363; 252/372; 141/38, 293, 294, 302, 4, 9, 57, 59, 66; 301/95-97

[56] References Cited

U.S. PATENT DOCUMENTS

| | | | |
|---|---|---|---|
| 2,339,381 | 1/1944 | Crowley | 141/38 X |
| 2,929,432 | 3/1960 | Kominic et al. | 152/415 |
| 3,047,041 | 7/1962 | Bottasso et al. | 152/363 |
| 3,498,341 | 3/1970 | Spereberg | 141/4 |
| 4,340,626 | 7/1982 | Rudy | 152/330 R |

Primary Examiner—William A. Powell
Assistant Examiner—Thomas Bokan
Attorney, Agent, or Firm—Becker & Becker, Inc.

[57] ABSTRACT

A filling gas for a tire having one or more hollow chambers, especially vehicle tires with a body of rubber or rubber-like material having suitable reinforcement inserts. Sulfur hexafluoride ($SF_6$) is used as the filling gas, which can also be a mixture of sulfur hexafluoride and one or more other gases, such as air. The tire hollow chamber, in comparison to the air, contains a greater quantity of sulfur hexafluoride. The ratio of air quantity to the quantity of sulfur hexafluoride is in the range of approximately 1:1 to 1:8.5. A relief or venting conduit is provided that extends into the vicinity of the highest location of the tire hollow chamber. Optionally, the rim breakthrough or valve leading to the tire hollow chamber is closed or sealed off. The valve for filling the tire hollow chamber, and the venting device may be arranged as a combined unit with respect to the rim body. The filling gas is introduced into the air-filled tire hollow chamber at an over-pressure; a pressure equalization is then brought about with respect to the atmosphere, and further filling gas is then introduced at over-pressure into the tire hollow chamber. The tire and rim may be permanently connected to each other in a gas-tight manner.

8 Claims, 1 Drawing Figure

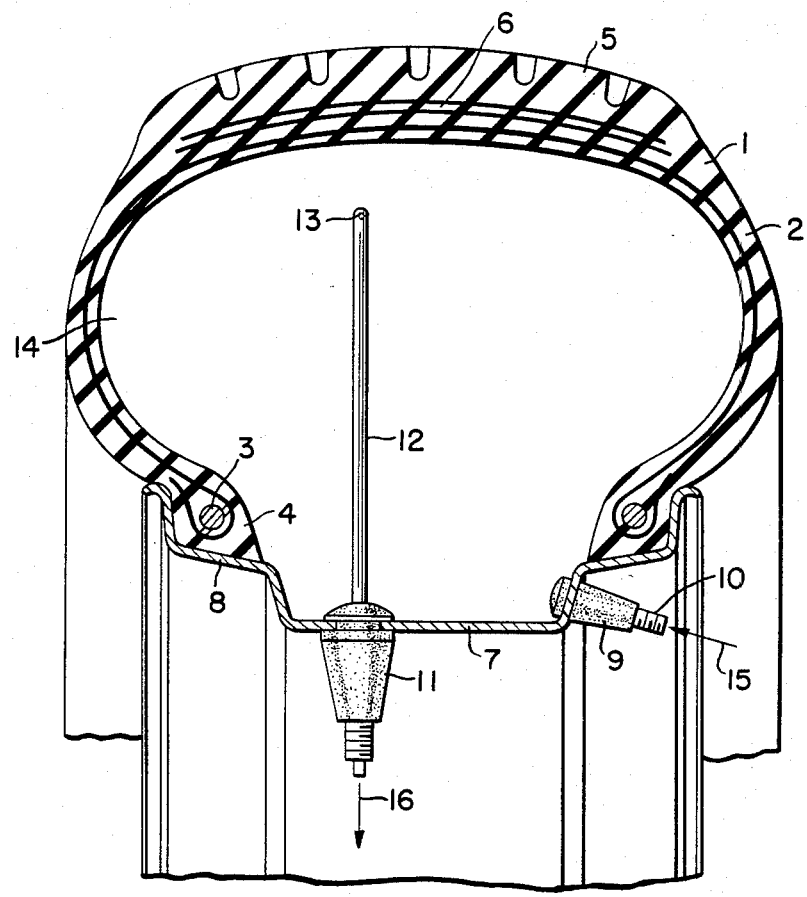

INFLATING GAS FOR TIRES

This is a continuation of U.S. patent application Ser. No. 121,642 Reese filed Feb. 14, 1980, now abandoned.

The present invention relates to a filling or inflating gas for tires having one or more hollow chambers, especially vehicle tires, the body of which generally comprises rubber or rubber-like material that in turn is reinforced by strengthening or reinforcing inserts, mostly in the form of a carcass.

Filling or inflating a tire hollow chamber with air, nitrogen, and carbon dioxide is known. Additionally, tire filling or inflating means were already suggested with which the filled-in gas, for instance isoprene, is to hinder or preclude a thermal decomposition of the rubber.

When these tire filling means are used, however, a gas loss, and accordingly a pressure loss, cannot be hindered or precluded.

It is therefore an object of the present invention to provide a filling or inflating gas for tires, especially vehicle tires, such that the inflating gas neither penetrates nor permeates the walls of the tire or tube, so that a disadvantageous influencing of the tire wall, and the reinforcement inserts located therein, is precluded by the filling or inflating gas.

This object, and other objects and advantages of the present invention, will appear more clearly from the following specification in connection with the accompanying drawing, which illustrates a partial section through the highest location of a wheel for a street vehicle.

To realize the object of the present invention, the use of sulfur hexafluoride ($SF_6$), subsequently referred to as the filling or inflating gas, is proposed. This filling or inflating gas has comparatively large molecules, so that the gas cannot penetrate through the inner core, or permeate the wall of the tire at all. A comparatively quick gas loss is accordingly forestalled or prevented: a pressure build-up within the tire walls, especially within the carcass, is accordingly also precluded.

The filling gas molecule advantageously has no chain form, but rather has a compact octahedral construction: the greater diameter conditioned thereby precludes or makes more difficult the penetration of the molecule into the inner core or tube located mostly within the tire body. The filling gas is additionally chemically inert or inactive; at temperatures too far above the operating temperatures of vehicle tires, the filling gas behaves like an inert gas or noble gas, and decomposes or disassociates only at comparatively high temperatures not attainable in tire operation. The filling gas does not react with any other material, and consequently does not attack either rubber or metal. Additionally, the filling gas is colorless and odorless; it is not combustible, and is also not hazardous to health. In addition, the filling gas can be mixed thoroughly with air, in which connection it is advantageous to provide more filling gas in the tire hollow chamber or interior (in comparison to air). The ratio can be to 1:1.5 to 1:8.6; it is advantageous to utilize mixing ratios having greater filling gas proportions with larger tires, especially with huge or balloon tires.

On the basis of the invention, special features or measures and procedures can be applied for utilization of the filling gas.

The rim body of the pertaining vehicle wheel can be provided with a venting conduit or passage reaching into the vicinity of the highest location of the tire hollow chamber, so that during filling-in of the filling or inflating gas by conventional filling valve, the specifically lighter air can escape in conformity with the degree of filling or inflating of the tire hollow chamber. For this purpose, two valves, i.e., a filling valve and a venting valve, can be used, though it is naturally possible to combine or unify both valve devices in a double valve.

Moreover, it is also possible to merely introduce the filling or inflating gas through a normal tire valve or through an individual valve by introducing the filling or inflating gas at an over-pressure, so that in the tire a mixture of air and filling gas results. Subsequently, a pressure equalization can be brought about, and the filling gas can again be introduced. The frequency of these steps determines the concentration of the filling gas within the tire hollow chamber.

With a high concentration of the filling gas, in each case however with a tire filling consisting only of the filling gas, there can even occur a sealing or closing off of the valves or break-through located in the tire rim body in order to assure that pressure losses resulting from leakage, porosity, perviousness or permeability in the tire rim body, are avoided. It is even possible to connect the tire and rim permanently with each other.

Referring now to the drawing in detail, the tire body 1 comprises rubber or rubber-like material and has a radial carcass 2 which is secured or anchored by being looped around the bead cores 3 in the beads 4. The carcass 2, in a well known manner, comprises pull-resistant cord threads of suitable material.

A pull-resistant belt 6 is located between the thread 5 and the carcass 2, and extends essentially over the width of the tread 5.

The rim 7 of the vehicle wheel comprises steel or the like and has seating surfaces 8, for receiving the tire beads 4, and, in a known manner, a filling or inflating valve 9 with a thread connection 10. The rim body 7 additionally has a gas-tight holding means 11 installed in a recess of the rim body 7 for insertion of a venting tube or pipe 12. The inlet flow opening 13 of the venting tube or pipe 12 is located near the free end of the tube 12 and can be guided into the vicinity of the highest location of the tire hollow chamber 14. The tire hollow chamber 14 accordingly can be filled or inflated with gas in the direction of the arrow 15. The gas located in the tire hollow chamber 14 can then escape through the inlet flow opening 13 and the venting pipe 12 in the direction of the arrow 16.

The filling or inflating gas is introduced through the valve 9 in a known manner. The air located within the tire hollow chamber and displaced by the filling or inflating gas can escape in the direction of the arrow 16.

When a desired quantity of air has escaped or flown out, the holding means 11 is closed. Then the tire inner pressure can be increased by further supply of the filling or inflating gas.

It is to be understood that the relief or venting pipe 12 is removed after filling or inflating of the tire hollow chamber 14.

The invention has the great advantage that special layers are not necessary for those sides of the walls of the tire body 1 facing the tire hollow chamber 14. This is especially important for tubeless tires, i.e., those tires which eliminate an annular tube or hose within the tire hollow chamber 14. The filling or inflating gas is, however, equally advantageous for those tires which do have a tube within the tire hollow chamber 14.

In summary, filling or inflating gas is made available for tires, especially vehicle tires having one or more hollow chambers and a body comprising rubber or rubber-like material and possibly provided with reinforcing inserts. The filling or inflating gas is sulfur hexafluoride ($SF_6$). The filling gas can be a mixture of sulfur hexafluoride and one or more other gases. As another gas, air can be used with the filling or inflating gas of sulfur hexafluoride. The tire hollow chamber, in comparison to the air, contains a greater quantity of sulfur hexafluoride. The ratio of the air quantity to the quantity of sulfur hexafluoride ranges approximately between 1:1 to 1:8.5. The filling of tires for passenger motor vehicles, and smaller tires, generally utilizes a mixture ratio ranging between approximately 1:1.5 to 1:5. The filling gas with truck tires utilizes a mixture ratio in a range of approximately 1:4 to 1:8.6.

A wheel having the aforementioned gas filling is provided with a venting conduit extending to a location in the vicinity of the highest point of the tire hollow chamber. The wheel includes a rim break-through or passage (valve 9) leading to the tire hollow chamber, with such valve being capable of being sealed or closed off. The valve 9 for filling the tire hollow chamber 14, and the venting device 11, 12, 13, are arranged as a combined unit with respect to the rim body 7.

The filling gas is introduced at an over-pressure into the air-filled tire hollow chamber; a pressure equalization is then brought about with respect to the atmosphere, and further filling gas is then introduced at over-pressure into the tire hollow chamber. The filling or inflating of the tire hollow chamber with the filling gas, and the venting, are repeatedly carried out. The tire and the rim may be permanently connected to each other in a gas-tight manner.

The present invention is, of course, in no way restricted to the specific disclosure of the specification and drawing, but also encompasses any modifications with the scope of the appended claims.

What is claimed is:

1. A filling gas mixture for a vehicle tire provided with at least one hollow chamber, especially a vehicle tire, with a body of rubber or rubber-like material provided suitably with reinforcement inserts, the improvement therewith comprising: a chemically inert heavy filling gas mixture that consists of air and sulfur-hexafluoride and particularly that air volume in relation to volume of the sulfur-hexafluoride has a ratio in a range of approximately 1:1 to 1:8.5 having obstructive diffusion characteristics of sulfur-hexa-fluoride exclusively for inflation of the body of rubber or rubber-like material of the vehicle tire.

2. A filling gas mixture chemically inert and inactive particularly in vehicle tires inflated therewith and having at least one hollow chamber adapted to receive said gas mixture exclusively in the inflation thereof and a tire body comprising elastomeric material, said filling gas mixture to maintain inflation including particularly therewith sulfur hexa-fluoride ($SF_6$) having comparatively large molecules of compact octahedral construction which serve to hinder and preclude gas mixture loss and accordingly inflation pressure loss therefrom due to gas mixture permeation and penetration through the elastomeric material, said filling gas consisting of chemically inert and inactive sulfur hexa-fluoride and at least one other gas which is air therewith, said at least one hollow chamber being adapted assuredly to contain a greater quantity of chemically inert and inactive sulfur hexa-fluoride than remaining quantity of air, the ratio of air quantity relative to sulfur hexa-fluoride quantity being approximately in a range of 1:1 to 1:8.6, respectively.

3. A filling gas mixture according to claim 2, in which for passenger car tires and tires smaller than passenger car tires, said ratio of air quantity relative to sulfur hexa-fluoride quantity is approximately in a range of only 1:1.5 to 1:5.

4. A filling gas mixture according to claim 2, in which for truck tires, said ratio of air quantity relative to sulfur hexa-fluoride quantity is approximately in a range of only 1:4 to 1:8.6.

5. A wheel with a rim supporting thereon a vehicle tire having at least one hollow chamber adapted to receive inert sulfur hexa-fluoride filling gas mixture, said wheel comprising a venting tube which extends into said at least one hollow chamber particularly in the vicinity of the highest point thereof.

6. A wheel according to claim 5, which includes a rim breakthrough valve which leads to said at least one hollow chamber and is capable of being sealed or closed off.

7. A wheel according to claim 6, in which said valve and said venting tube are sealingly associated with said rim as a combined unit.

8. A wheel according to claim 6, in which said rim is connected permanently with a tire in a gas-tight manner.

* * * * *